UNITED STATES PATENT OFFICE.

HARRY L. HAAS, OF NEW YORK, N. Y., ASSIGNOR TO ZUCKER & LEVETT & LOEB COMPANY, OF NEW YORK, N. Y., A CORPORATION OF NEW YORK.

PROCESS OF MELTING NICKEL.

SPECIFICATION forming part of Letters Patent No. 709,218, dated September 16, 1902.

Application filed April 17, 1901. Serial No. 56,186. (No specimens.)

*To all whom it may concern:*

Be it known that I, HARRY L. HAAS, a citizen of the United States, residing in the borough of Manhattan, city and State of New York, (with a post-office address at 526 West Twenty-fifth street, in the said borough of Manhattan,) have invented certain new and useful Improvements in Melting Nickel, of which the following is a full and true description.

My invention relates to a new and simplified process for melting nickel, whereby the nickel may be melted more quickly and economically than heretofore and result in a practically pure condition.

Prior to my invention it has been the usual practice in melting nickel to put the granular nickel in crucibles of plumbago or like material, and to place the crucibles upon and surround them by fuel in a suitable furnace, and to subject the crucibles to an intense heat in connection with an air-blast until the nickel has been reduced to a fluid state adapted to readily flow from the crucible when poured. The time required to melt thirty-five pounds of granular nickel contained in a crucible was from one and one-half to two hours, according to the heat employed, and the amount of fuel required to melt such a quantity of nickel averaged one hundred and twenty-five pounds. In addition to fuel the cost of the crucibles rendered the process very expensive. Usually a crucible had to be discarded after the second or third charge melted in it, and owing to the increasing demand plumbago crucibles have been steadily increasing in price. It is also well known that molten nickel absorbs carbon, and in the process of melting nickel in crucibles the nickel has absorbed carbon from the plumbago, and its value and usefulness, especially for electroplating, has been correspondingly reduced. To neutralize the effect of the carbon, alloys have been mixed with the molten nickel, and this has been found to be effective to some degree. If the proper degree of heat was not maintained during the melting, and this was somewhat difficult, the nickel anodes made therefrom would be porous and full of blow-holes and other imperfections and the grain would not be of that fine and compact character requisite for the best work in electroplating, especially in that the anodes would not wear evenly or well in the plating-bath and would rot and break off in the liquid. In order to bring the nickel to the pure condition desired for anodes, the nickel has been subjected to several meltings with a consequent increase in the expense of manufacture. It was also found to be very difficult to treat two or more crucibles simultaneously in the same furnace. While pouring one crucible the remainder were liable to be cooled and the nickel thereinto set, rendering it unfit for use until reheated. Another and perhaps the greatest objection to the melting of nickel in crucibles was that the process was not in any sense continuous and was very slow. The time required to melt nickel in a crucible—necessitating the attainment of a temperature of 2,800° Fahrenheit or more—has usually been one and one-half hours, and before removing a crucible the furnace was allowed to cool, requiring it to be reheated after the substitution of a new crucible.

My invention relates to a new and improved process for quickly and economically melting nickel without employing crucibles; and it consists in subjecting granular nickel directly to the heat of fuel, placing the nickel into the fuel, and allowing the nickel when melted to pass downwardly through the fuel and to be caught in a suitable compartment or receptacle. In order, however, to melt the nickle when directly subjected to the heat of the fuel, I have found that the heat must be very intense, and for this purpose it is necessary to employ a blast of air under great pressure much greater than that ordinarily used in the melting of metals in cupola-furnaces.

In carrying out my new process I have attained excellent results by the following practice: The bed of fuel is first made in the cupola-furnace, and the fire is allowed to burn for some time—say, for one hour—before the blast is put on. After the blast has commenced the fuel and nickel are added to the fire preferably in the order named and as often as desired to make the process continuous. While the proportion of nickel with relation to the fuel may be varied, I have obtained the best results when employing at first, say for the first, second, third, and fourth charges, equal parts of fuel and granular nickel, and thereafter during the continuation of the process employing alternate charges of fuel and nickel in the proportions of (about) two-fifths fuel to three-fifths metal. After the first charges are subjected to the blast for about ten minutes the nickel begins to flow through the fire at an absolutely white heat and flows thereafter continuously as long as the charges of fuel and nickel are supplied. The melted nickel falls on a bed of fine sand or into a suitable receptacle from which the nickel may be drawn or poured as desired.

The quantities of fuel and nickel which I have ascertained by experiment to give the best results are the following: For the original bed of fuel, one hundred and twenty-two pounds coke and three hundred pounds coal; for the first, second, third, and fourth charges after the blast is put on, sixty-one pounds coke, one hundred and two pounds coal, and one hundred and sixty pounds metal; for the remaining charges, sixty-one pounds coke, one hundred and two pounds coal, and two hundred and sixty pounds metal. I preferably employ a No. 6 Sturtevant cupola-blower, running about three thousand revolutions per minute and connected to an eighteen horse-power machine. This gives fifteen hundred cubic feet of air at fourteen-ounce pressure per minute and as a consequence develops an intense heat in the furnace. I may, as desired, add alloys to the nickel either before or after the same is melted.

The advantages of my new process are, first, dispensing with the use of crucibles; second, a material decrease in the amount of fuel required to melt a given quantity of nickel; third, the production economically and quickly of practically pure fluid nickel, and, fourth, the attainment, by the employment of large quantities of air under great pressure, of a higher degree of heat to melt the nickel and then directly subjecting the nickel to the white-hot fuel.

I am aware that the cupola process for melting iron has been in common use; but I do not regard the practice of such process as teaching my new process. The melting-point (2,800° Fahrenheit) of nickel is nearly fifty per cent. higher than that of iron, and the nickel requires to be subjected to heat for a much longer time than iron.

Prior to my invention it had been universally believed, so far as I can understand, that it was impossible to melt nickel by directly subjecting the same to a fire, because it was understood that the nickel would run therefrom in an unmelted state, and it was also believed that the product of such a process would necessarily be impure. The result sought for could not be accomplished by following the practice of those skilled in the melting of iron in cupola-furnaces, since the temperatures attained in such furnaces would not be high enough to melt nickel, and the latter would flow from the fuel in an unrefined state; nor would the amount of air usually supplied to cupola-furnaces for melting iron suffice for melting and refining of nickel. I have found after experimenting for some time that the use of great quantities of air at high pressure tends to oxidize the carbon, if any, absorbed by the nickel, and the heat is so intense as to cause the nickel to be reduced to absolutely fluid state and practically pure. Castings made therefrom are absolutely free from blow-holes and porosity and of fine compact grain. This is especially of advantage in the manufacture of anodes for nickel-plating.

What I claim, and desire to secure, is—

1. The continuous process of melting and refining nickel containing carbon, consisting in subjecting a column of a mixture of nickel in granular form directly with fuel to heat generated from said fuel; passing large quantities of air under excessive pressure upwardly through the entire column of nickel and fuel, to assure a temperature above the melting-point of nickel, and to oxidize the carbon in the nickel; allowing the melting nickel to flow downwardly through the mass and in contact with the air, drawing off the melted nickel with more or less continuity below the column; and supplying fuel and granular nickel as necessary to the top of the column to maintain the temperature and to continue the process, substantially as described.

2. The continuous process of melting and refining nickel containing carbon, consisting in subjecting a column of a mixture of nickel in granular form directly with fuel to heat generated from said fuel; then passing large quantities of air under excessive pressure upwardly through the entire column of nickel and fuel, to assure a temperature above the melting-point of the nickel, and to oxidize the carbon in the nickel; allowing the melting nickel to flow downwardly through the mass and in contact with the air, and drawing off the melted nickel with more or less continuity below the column, substantially as described.

In witness whereof I have hereunto signed my name this 12th day of April, 1901.

HARRY L. HAAS.

In presence of—
  JOSEPH J. MALONEY,
  CHAS. LOEB.